United States Patent
Li

(10) Patent No.: US 10,871,844 B1
(45) Date of Patent: Dec. 22, 2020

(54) DISPLAY PANEL AND METHOD OF FABRICATING THEREOF

(71) Applicant: WUHAN CHINA STAR OPTOELECTRONICS SEMICONDUCTOR DISPLAY TECHNOLOGY CO., LTD., Hubei (CN)

(72) Inventor: Yuanhang Li, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/639,751

(22) PCT Filed: Nov. 4, 2019

(86) PCT No.: PCT/CN2019/115269
§ 371 (c)(1),
(2) Date: Feb. 18, 2020

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 2203/04103* (2013.01)

(58) Field of Classification Search
CPC ................. G06F 3/0412; G06F 3/0446; G06F 2203/04103
See application file for complete search history.

(56) References Cited

U.S. PATENT DOCUMENTS

| 9,898,134 B2 * | 2/2018 | Wang ..................... G06F 3/0412 |
| 2020/0012386 A1 * | 1/2020 | Zhang .................... G06F 3/0416 |
| 2020/0264728 A1 * | 8/2020 | Qin ........................ G06F 3/0421 |

* cited by examiner

*Primary Examiner* — Stacy Khoo
(74) *Attorney, Agent, or Firm* — Mark M. Friedman

(57) ABSTRACT

The present application provides a display panel and a method of fabricating thereof. The display panel includes a light emitting layer and a touch layer. The touch layer includes a touch trace layer and a filter structure, and the touch trace layer includes a plurality of gaps. The touch trace layer includes a first metal layer, a light shielding layer and a second metal layer, and an area of the light shielding layer is greater than an area of the first metal layer. Projections of the plurality of gaps on a light emitting surface of the display panel separates with a projection of the first metal layer and the second metal layer on the light emitting layer.

13 Claims, 2 Drawing Sheets

US 10,871,844 B1

DISPLAY PANEL AND METHOD OF FABRICATING THEREOF

CROSS REFERENCE TO RELATED APPLICATION

This application claims the priority of International Application No. PCT/CN2019/115269, filed on 2019 Nov. 4, which claims priority to Chinese Application No. 201910723655.4, filed on 2019 Aug. 7. The entire disclosures of each of the above applications are incorporated herein by reference.

BACKGROUND OF INVENTION

Field of Invention

The present invention relates to the field of electronic display, and in particular, to a display panel and a method of fabricating thereof.

Description of Prior Art

In the prior art, in order to reduce a thickness of electronic devices having a touch function, a touch structure is usually directly integrated on a display panel by direct on touch (DOT) technology. Compared with an external touch structure, the DOT structure is thinner and lighter, and can be applied to a flexible display panel.

Technical Problems

In the prior art, the DOT structure is integrated above a polarizing layer of the display panel. The polarizing layer consists a polarizer for reducing reflectance of the display panel under strong light. Generally, a thickness of the polarizer is around 100 micrometers, which is disadvantageous for reducing the thinness of the display panel. At the same time, the polarizer seriously reduces a light emitting rate of the display panel, which deteriorates display effect of the display panel and accelerates an aging rate of the display panel.

SUMMARY OF INVENTION

The present application provides a display panel and a method of fabricating thereof to increase a transmittance of the display panel while reducing the thickness of the display panel.

The application provides a display panel comprising a light emitting layer and a touch layer located above the light emitting layer;

wherein the light emitting layer comprises a plurality of light emitting units;

wherein the touch layer comprises:

a touch trace layer comprising a plurality of gaps, wherein the gaps correspond to the plurality of light emitting units; and a filter structure comprising a plurality of filters, wherein the filters are disposed in the plurality of gaps of the touch trace layer;

wherein the touch trace layer comprises a first metal layer, a light shielding layer, and a second metal layer, an area of the light shielding layer is greater than an area of the first metal layer, a projection of the light shielding layer on the light emitting layer covers a projection of the first metal layer on the light emitting layer, and the second metal layer is disposed on the light shielding layer and is electrically connected to the first metal layer through a via hole;

wherein projections of the plurality of gaps on a light emitting surface of the display panel separates from projections of the first metal layer and the second metal layer on the light emitting layer.

According to one aspect of the application, wherein the display panel further comprises an isolation layer disposed between the light emitting layer and the touch layer, and the first metal layer is disposed on the isolation layer.

According to one aspect of the application, wherein the plurality of filters and the plurality of light emitting units are in one-to-one correspondence, and a color of light retained by any one of the filters is same as a color of light emitted by the light emitting unit corresponding to the filter.

According to one aspect of the application, wherein an area of any one of the filters is greater than an area of one of the gaps in which the any one of the filters is located, an edge of any one of the filters covers an edge of the light shielding layer adjacent to the any one of the filters.

According to one aspect of the application, wherein a sum of areas of the plurality of gaps is greater than a sum of areas of the plurality of light emitting units.

According to one aspect of the application, wherein the touch trace layer further comprises a planarization layer covering the light shielding layer and the filter structure, and the second metal layer is located on the planarization layer and is electrically connected to the first metal layer through a via hole.

According to one aspect of the application, wherein the isolation layer is provided with a plurality of groove structures in one-to-one correspondence with the plurality of filters, and a bottom of any one of the filters is correspondingly embedded in one of the groove structures of the any one of the filters.

The present application further provides a method of fabricating a display panel, wherein the method comprises the steps of:

forming a light emitting layer, wherein the light emitting layer comprising a plurality of light emitting units;

forming a touch trace layer above the light emitting layer, wherein the touch trace layer comprises a plurality of gaps, and the plurality of gaps are corresponding to the plurality of light emitting units;

forming a filter structure, wherein the filter structure comprises a plurality of filters, the filters are disposed in a plurality of gaps of the touch trace layer;

wherein the method for forming the touch trace layer comprises the following steps:

forming a first metal layer;

forming a light shielding layer having an area greater than an area of the first metal layer, and a projection of the light shielding layer on the light emitting layer covers a projection of the first metal layer on the light emitting layer;

forming a second metal layer, wherein the second metal layer is disposed on the light shielding layer, and is electrically connected to the first metal layer through a via hole;

wherein projections of the plurality of gaps on a light emitting surface of the display panel separates from projections of the first metal layer and the second metal layer on the light-emitting layer.

According to one aspect of the application, wherein the method further comprises the following steps after forming the light emitting layer:

forming an isolation layer on the light emitting layer.

According to one aspect of the application, wherein a method of forming the first metal layer and the light shielding layer comprises:

forming a metal film covering the isolation layer;

forming a black photoresist covering the metal film;

graphically patterning the black photoresist to form the light shielding layer;

patterning the metal thin film by using the black photoresist as a mask to form the first metal layer.

According to one aspect of the application, wherein the method of patterning the metal thin film is dry etching;

wherein an etching speed in a direction parallel to a surface of the metal thin film is less than or equal to an etching speed in a direction perpendicular to the surface of the metal thin film.

According to one aspect of the application, wherein the method further comprises the following steps after the metal thin film is patterned:

forming a plurality of groove structures on the isolation layer by using the black photoresist as a mask, and the groove structures have a depth smaller than a thickness of the isolation layer.

According to one aspect of the application, wherein the method forming the light shielding layer further comprises the following steps:

forming a planarization layer covering the light shielding layer and the filter structure.

Beneficial Effects

The present application replaces the polarizer in the prior art with a filter integrated in the touch structure, thereby effectively reduce the thickness of the display panel. Because a transmittance of the filter to light is much higher than a transmittance of the polarizer to light, the present application effectively improves the light transmittance of the display panel, and enhances the display effect and the service life of the display panel. At the same time, black light shielding matrix between the filters is used as a mask to pattern the metal layer in the touch structure, thereby masks for patterned metal layers can be reduced. The present application saves production costs while simplifying the manufacturing process.

DETAILED DESCRIPTION OF PREFERRED EMBODIMENTS

Figure 1:
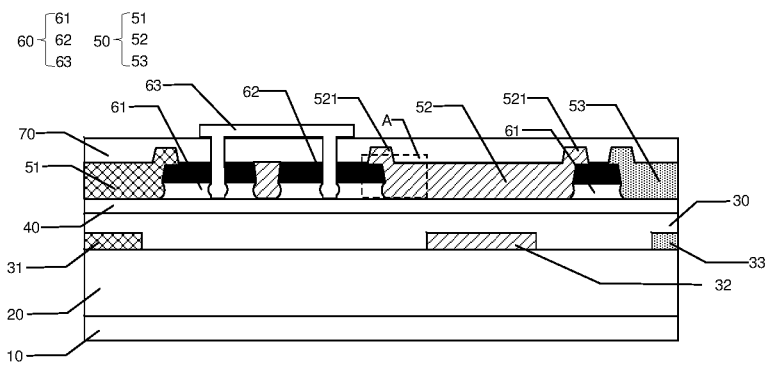
FIG. 1 is a structural diagram of a display panel in a specific embodiment of the present application.

Description of following embodiment, with reference to accompanying drawings, is used to exemplify specific embodiments which may be carried out in the present disclosure. Directional terms mentioned in the present disclosure, such as "top", "bottom", "front", "back", "left", "right", "inside", "outside", "side", etc., are only used with reference to orientation of the accompanying drawings. Therefore, the directional terms are intended to illustrate, but not to limit, the present disclosure. In the drawings, components having similar structures are denoted by same numerals.

The present application provides a display panel and a method of fabricating thereof to increase a transmittance of the display panel while reducing the thickness of the display panel.

Figure 2:
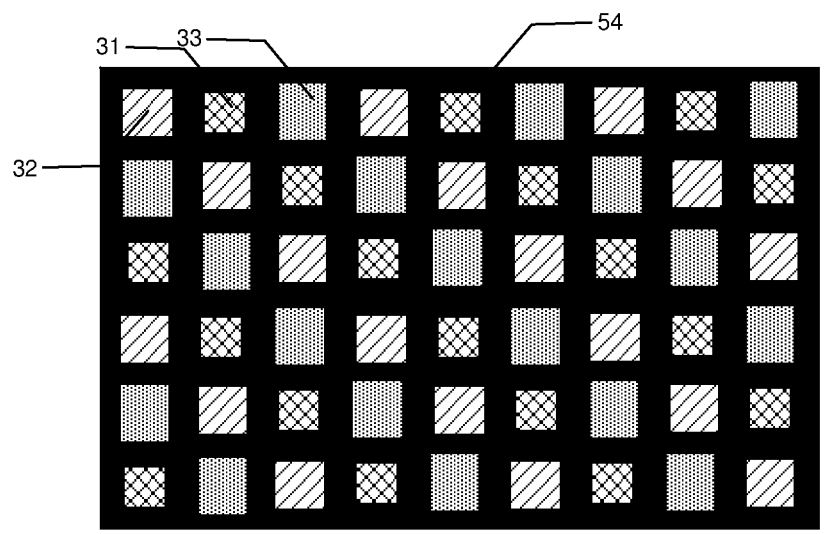
FIG. 2 is a plan view of the display panel of FIG. 1.
Figure 3:
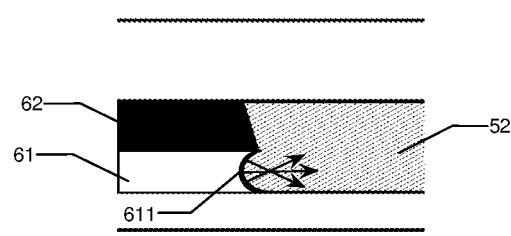
FIG. 3 is a partial enlarged view of a region A of the display panel of FIG. 1.
Figure 4:
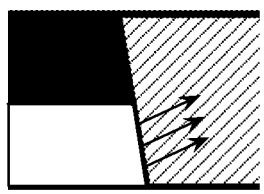
FIG. 4 is a partial enlarged view of a display panel of the prior art corresponding to FIG. 3.

Referring to FIG. 1 to FIG. 4, FIG. 1 is a structural diagram of a display panel in a specific embodiment of the present application. FIG. 2 is a plan view of the display panel of FIG. 1. FIG. 3 is a partial enlarged view of a region A of the display panel of FIG. 1. FIG. 4 is a partial enlarged view of a display panel of the prior art corresponding to FIG. 3.

The display panel in the present application includes a substrate 10, a thin film transistor layer 20, a light emitting layer 30, and a touch layer located above the light emitting layer 30. In this embodiment, the display panel further includes an isolation layer 40, and the isolation layer 40 is located between the light emitting layer 30 and the touch layer.

The light emitting layer 30 includes a plurality of light emitting units. The plurality of light emitting units include a red light emitting unit 31, a blue light emitting unit 32, and a green light emitting unit 33. The plurality of light emitting units are isolated by a pixel defining layer.

In the present application, the touch layer includes a touch trace layer 60 and a filter structure 50.

The touch layer 60 includes a plurality of gaps, wherein the gaps correspond to the plurality of light emitting units. The filter structure 50 comprising a plurality of filters, wherein the filters are disposed in the plurality of gaps of the touch trace layer 60. The touch trace layer 60 includes a first metal layer 61, a light shielding layer 62, and a second metal layer 63. The light shielding layer 62 covers the first metal layer 61. The second metal layer 63 is located on the light shielding layer 62 and is electrically connected to the first metal layer 61 through a through hole. projections of the plurality of gaps on a light emitting surface of the display panel separates from projections of the first metal layer and the second metal layer on the light emitting layer.

Referring to FIG. 1 and FIG. 3, an area of the light shielding layer 62 is greater than an area of the first metal layer 61, a projection of the light shielding layer 62 on the light emitting layer covers a projection of the first metal layer 61 on the light emitting layer. That is, a side of the first metal layer 61 is recessed with respect to the light shielding layer 62, and a recessed portion 611 is formed in the light shielding layer 62 and the isolation layer 40. The recessed portion 611 can irregularly reflect the light incident on the side of the first metal layer 61, and prevent external light from being reflected by the first metal layer 61 and entering a field of view of the users, as shown in FIG. 4.

In addition, the second metal layer 63 is electrically connected to the first metal layer 61 through a through hole. The second metal layer 63 and the first metal layer 61 are formed by different processes, and the material of the second metal layer 63 is different from the light shielding layer 62 and the planarization layer 70, therefore, the second metal layer 63 is at risk of peeling off. The recessed portion 611 can eliminate this risk well. Referring to FIG. 1, the metal in the through hole forms a protrusion that cooperates with the recessed portion due to the presence of the recessed portion 611, the protrusion and the recessed portion 611 are tightly engaged. Thus, fixing of the second metal layer 63 is achieved, and the risk of the second metal layer 63 peeling off is eliminated.

In the present application, the plurality of filters and the plurality of light emitting units are in one-to-one correspondence, and a color of light retained by any one of the filters is same as a color of light emitted by the light emitting unit corresponding to the filter. For example, in this embodiment, the filter disposed corresponding to the red light emitting unit 31 is a red light filter 51, the filter disposed corresponding to the blue light emitting unit 32 is a blue color filter 52, the filter provided corresponding to the green light emitting unit 33 is a green color filter 53.

Figure 5:
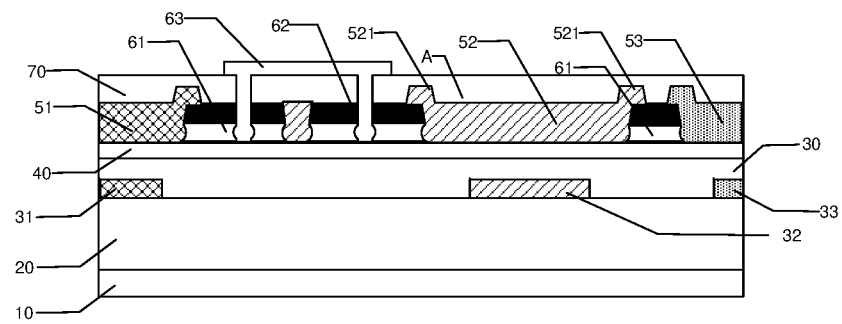
FIG. 5 is a structural diagram of a display panel in a second embodiment of the present application.

Referring to FIG. 5, a second embodiment of the present application is shown. The touch trace layer 60 further includes a planarization layer 70 covering the light shielding layer 62 and the filter structure 50. The second metal layer 63 is located on the planarization layer 70 and is electrically connected to the first metal layer 61 through a through hole.

In the present application, the light shielding layer 62 covers the first metal layer 61. The plurality of gaps are used to set a plurality of filters. Referring to FIG. 3, in accordance with a preferred embodiment of the present application, in order to ensure that the plurality of filters are located above the corresponding light emitting structure, an area of any one of the filters is greater than an area of one of the gaps in which the any one of the filters is located, an edge of any one of the filters covers an edge of the light shielding layer 62 adjacent to the any one of the filters, and a sum of areas of the plurality of gaps is greater than a sum of areas of the plurality of light emitting units.

Referring to FIG. 2, FIG. 2 is a top view of the display panel of FIG. 1. In the present application, the light shielding layer 62 serves as a black matrix, and constitutes a filter structure with a plurality of filters. The light shielding layer 62 can eliminate the pair of light of the display panel under strong light and instead of the polarizer. At the same time, the filter structure is integrated in the touch layer 40, and the light shielding layer 62 can be used as a mask to pattern the touch trace layer. In this way, the thickness of the display panel is effectively reduced, and the mask for the patterned metal layer is reduced as well, which simplifies the manufacturing process and saves the manufacturing cost.

Similarly, in order to ensure the filtering effect of the filter structure, an area of any one of the filters is greater than an area of one of the gaps in which the any one of the filters is located, an edge of any one of the filters covers an edge of the light shielding layer 62 adjacent to the any one of the filter, as shown in FIG. 1 and FIG. 3.

Figure 6:
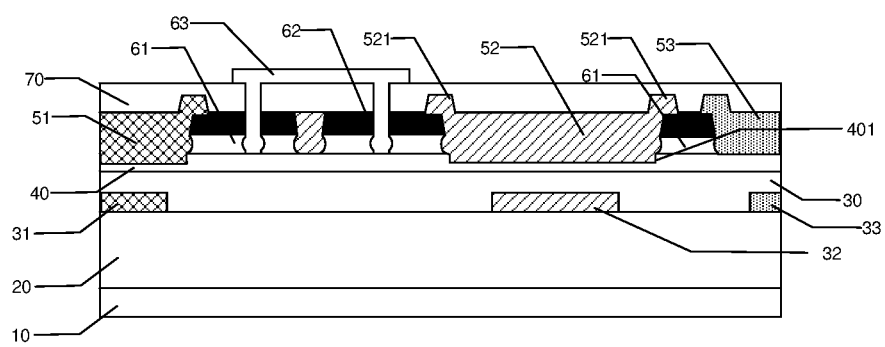
FIG. 6 is a structural diagram of a display panel in a third embodiment of the present application.

Referring to FIG. 6, a third embodiment of the present application is shown. In the present application, in order to further optimize the filter structure, a plurality of groove structures 401 are disposed on the isolation layer 40. The plurality of groove structures 401 are in one-to-one correspondence with the plurality of filters. A bottom of any one of the filters is embedded in the corresponding groove structure 401 of the filter. The groove structure 401 can increase the thickness of the plurality of filters to obtain a better filter effect.

Correspondingly, the present application also provides a method for manufacturing a display panel, the method comprising the following steps.

First, forming a light emitting layer, the light emitting layer comprising a plurality of light emitting units. The plurality of light emitting units include a red light emitting unit 31, a blue light emitting unit 32, and a green light emitting unit 33. The plurality of light emitting units are isolated by a pixel defining layer.

Then forming a touch trace layer 60 and a filter structure 50 above the light emitting layer. The touch trace layer 60 comprises a plurality of gaps, and the plurality of gaps are corresponding to the plurality of light emitting units. The filter structure 50 comprises a plurality of filters, the filters are disposed in a plurality of gaps of the touch trace layer 60.

In the present embodiment, the method for forming the touch trace layer comprises the following steps: forming a first metal layer 61. Forming a light shielding layer 62 having an area greater than an area of the first metal layer 61, and a projection of the light shielding layer 62 on the light emitting layer covers a projection of the first metal layer 61 on the light emitting layer. Forming a second metal layer 63, wherein the second metal layer 63 is disposed on the light shielding layer 62, and is electrically connected to the first metal layer 61 through a through hole. Projections of the plurality of gaps on a light emitting surface of the display panel separates from projections of the first metal layer 61 and the second metal layer 63 on the light emitting layer.

In the present embodiment, the method further comprises the following steps after forming the light emitting layer: forming an isolation layer 40 on the light emitting layer.

In the present embodiment, a method of forming the first metal layer 61 and the light shielding layer 62 comprises: forming a metal film covering the isolation layer. Forming a black photoresist covering the metal film. Graphically patterning the black photoresist to form the light shielding layer 62. Patterning the metal thin film by using the black photoresist as a mask to form the first metal layer 61.

In the present application, the light shielding layer 62 serves as a black matrix, and constitutes a filter structure with a plurality of filters. The light shielding layer 62 can eliminate the reflection of light of the display panel under strong luminance and instead of the polarizer. At the same time, the filter structure is integrated in the touch layer 40, and the light shielding layer 62 can be used as a mask to pattern the touch trace layer. In this way, the thickness of the display panel is effectively reduced, and the mask for the patterned metal layer is reduced as well, which simplifies the manufacturing process and saves manufacturing costs.

In the present application, the method of patterning the metal thin film is dry etching. An etching speed in a direction parallel to a surface of the metal thin film is less than or equal to an etching speed in a direction perpendicular to the surface of the metal thin film. Referring to FIG. 1 and FIG. 3, an area of the light shielding layer 62 is greater than an area of the first metal layer 61, a projection of the light shielding layer 62 on the light emitting layer covers a projection of the first metal layer 61 on the light emitting layer. That is, a side of the first metal layer 61 is recessed with respect to the light shielding layer 62, and a recessed portion 611 is formed in the light shielding layer 62 and the isolation layer 40. The recessed portion 611 can irregularly reflect the light incident on the side of the first metal layer 61, and prevent external light from being reflected by the first metal layer 61 and entering a field of view of the users, as shown in FIG. 4.

In the present application, the method further comprises the following steps after the metal thin film is patterned: forming a plurality of groove structures 401 on the isolation layer 40 by using the black photoresist as a mask, and the groove structures 401 have a depth smaller than a thickness of the isolation layer 40. The plurality of groove structures 401 are in one-to-one correspondence with the plurality of filters. A bottom of any one of the filters is embedded in the corresponding groove structure 401 of the filter. The groove structure 401 can increase the thickness of the plurality of filters to obtain a better filter effect, as shown in FIG. 6.

The present application replaces the polarizer in the prior art with a filter integrated in the touch structure, thereby effectively reduce the thickness of the display panel. Because a transmittance of the filter to light is much higher than a transmittance of the polarizer to light, the present application effectively improves the light transmittance of the display panel, and enhances the display effect and the service life of the display panel. At the same time, black light shielding matrix between the filters is used as a mask to pattern the metal layer in the touch structure, thereby masks for patterned metal layers can be reduced. The present application saves production costs while simplifying the manufacturing process.

As is understood by persons skilled in the art, the foregoing preferred embodiments of the present disclosure are illustrative rather than limiting of the present disclosure. It is intended that they cover various modifications and that similar arrangements be included in the spirit and scope of the present disclosure, the scope of which should be accorded the broadest interpretation so as to encompass all such modifications and similar structures.

What is claimed is:

1. A display panel comprising a light emitting layer and a touch layer located above the light emitting layer;
    wherein the light emitting layer comprises a plurality of light emitting units;
    wherein the touch layer comprises:
        a touch trace layer comprising a plurality of gaps, wherein the gaps correspond to the plurality of light emitting units; and
        a filter structure comprising a plurality of filters, wherein the filters are disposed in the plurality of gaps of the touch trace layer;
    wherein the touch trace layer comprises a first metal layer, a light shielding layer, and a second metal layer, an area of the light shielding layer is greater than an area of the first metal layer, a projection of the light shielding layer on the light emitting layer covers a projection of the first metal layer on the light emitting layer, and the second metal layer is disposed on the light shielding layer and is electrically connected to the first metal layer through a via hole; and
    wherein projections of the plurality of gaps on a light emitting surface of the display panel separates from projections of the first metal layer and the second metal layer on the light emitting layer.

2. The display panel according to claim 1, wherein the display panel further comprises an isolation layer disposed between the light emitting layer and the touch layer, and the first metal layer is disposed on the isolation layer.

3. The display panel according to claim 1, wherein the plurality of filters and the plurality of light emitting units are in one-to-one correspondence, and a color of light retained by any one of the filters is same as a color of light emitted by the light emitting unit corresponding to the filter.

4. The display panel according to claim 3, wherein an area of any one of the filters is greater than an area of one of the gaps in which the any one of the filters is located, an edge of any one of the filters covers an edge of the light shielding layer adjacent to the any one of the filters.

5. The display panel according to claim 3, wherein a sum of areas of the plurality of gaps is greater than a sum of areas of the plurality of light emitting units.

6. The display panel according to claim 3, wherein the touch trace layer further comprises a planarization layer covering the light shielding layer and the filter structure, and the second metal layer is located on the planarization layer and is electrically connected to the first metal layer through a via hole.

7. The display panel according to claim 2, wherein the isolation layer is provided with a plurality of groove structures in one-to-one correspondence with the plurality of filters, and a bottom of any one of the filters is correspondingly embedded in one of the groove structures of the any one of the filters.

8. A method of fabricating a display panel, wherein the method comprises the steps of:
    forming a light emitting layer, wherein the light emitting layer comprises a plurality of light emitting units;
    forming a touch trace layer above the light emitting layer, wherein the touch trace layer comprises a plurality of gaps, and the plurality of gaps correspond to the plurality of light emitting units;
    forming a filter structure, wherein the filter structure comprises a plurality of filters, the filters disposed in a plurality of gaps of the touch trace layer;
    wherein the method for forming the touch trace layer comprises the following steps:
        forming a first metal layer;
        forming a light shielding layer having an area greater than an area of the first metal layer, and a projection of the light shielding layer on the light emitting layer covers a projection of the first metal layer on the light emitting layer; and
        forming a second metal layer, wherein the second metal layer is disposed on the light shielding layer, and is electrically connected to the first metal layer through a via hole;
    wherein projections of the plurality of gaps on a light emitting surface of the display panel separates from projections of the first metal layer and the second metal layer on the light-emitting layer.

9. The method of fabricating a display panel according to claim 8, wherein the method further comprises the following steps after forming the light emitting layer:
    forming an isolation layer on the light emitting layer.

10. The method of fabricating a display panel according to claim 9, wherein a method of forming the first metal layer and the light shielding layer comprises:
    forming a metal film covering the isolation layer;
    forming a black photoresist covering the metal film;
    graphically patterning the black photoresist to form the light shielding layer; and
    patterning the metal thin film by using the black photoresist as a mask to form the first metal layer.

11. The method of fabricating a display panel according to claim 10, wherein the method of patterning the metal thin film is dry etching;
    wherein an etching speed in a direction parallel to a surface of the metal thin film is less than or equal to an etching speed in a direction perpendicular to the surface of the metal thin film.

12. The method of fabricating a display panel according to claim 10, wherein the method further comprises the following steps after the metal thin film is patterned:
    forming a plurality of groove structures on the isolation layer by using the black photoresist as a mask, and the groove structures have a depth smaller than a thickness of the isolation layer.

13. The method of fabricating a display panel according to claim 8, wherein the method forming the light shielding layer further comprises the following steps:

forming a planarization layer covering the light shielding layer and the filter structure.

* * * * *

UNITED STATES PATENT AND TRADEMARK OFFICE
CERTIFICATE OF CORRECTION

PATENT NO. : 10,871,844 B1
APPLICATION NO. : 16/639751
DATED : December 22, 2020
INVENTOR(S) : Yuanhang Li Page 1 of 1

It is certified that error appears in the above-identified patent and that said Letters Patent is hereby corrected as shown below:

On the Title Page

Insert --(30) Foreign Application Priority Data
August 7, 2019 (CN) 201910723655.4--

Signed and Sealed this
Sixth Day of April, 2021

Drew Hirshfeld
*Performing the Functions and Duties of the
Under Secretary of Commerce for Intellectual Property and
Director of the United States Patent and Trademark Office*